Feb. 27, 1968  E. L. MINGES  3,370,607
APPARATUS FOR CONTROLLING THE FLOW OF FLUIDS
Filed April 18, 1966
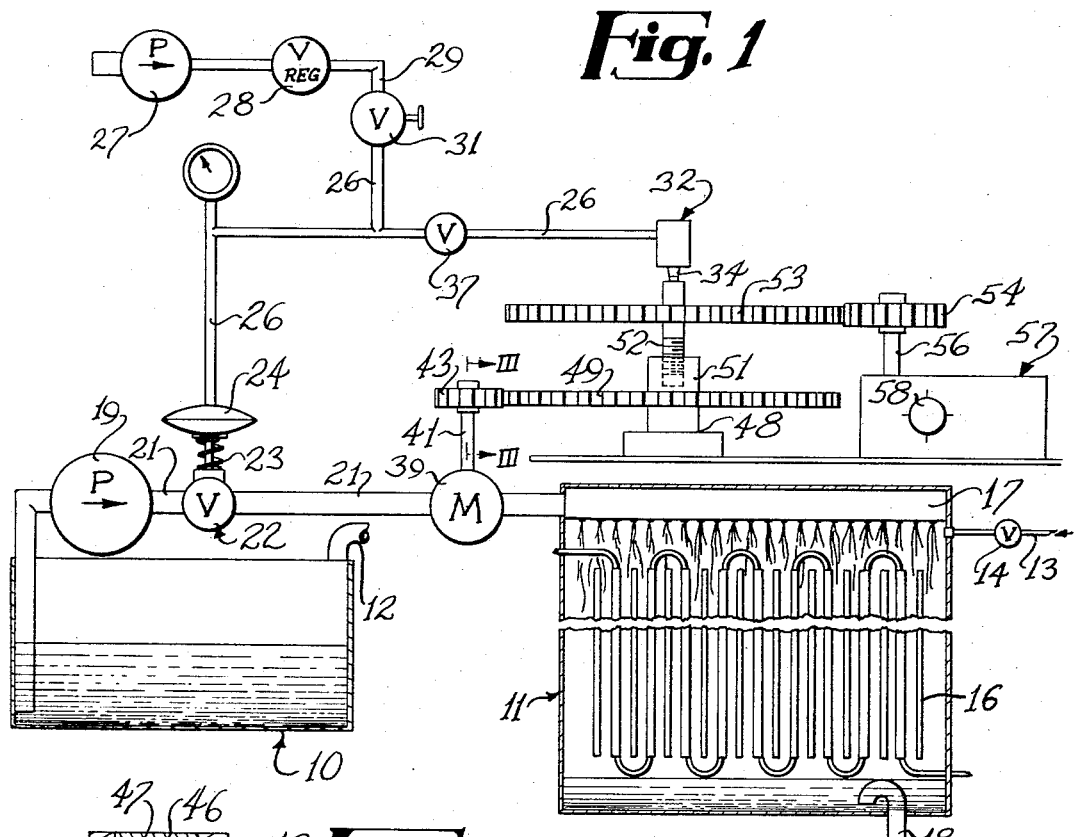
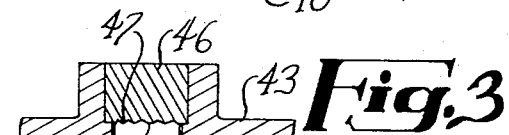
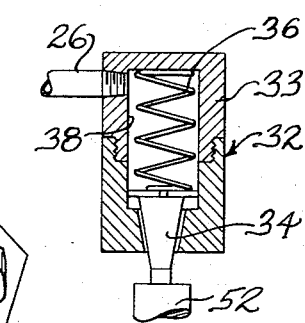
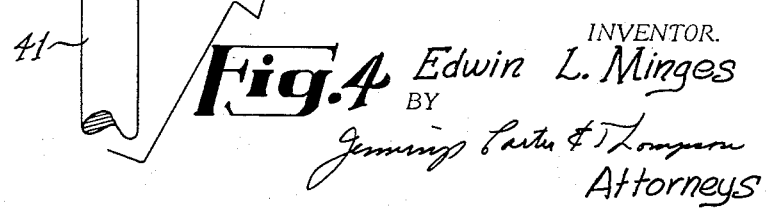
INVENTOR.
Edwin L. Minges
BY
Jennings Carter & Thompson
Attorneys 3,370,607
APPARATUS FOR CONTROLLING THE
FLOW OF FLUIDS
Edwin L. Minges, P.O. Box 1968,
Tuscaloosa, Ala. 35401
Filed Apr. 18, 1966, Ser. No. 543,345
2 Claims. (Cl. 137—486)

ABSTRACT OF THE DISCLOSURE

A process and apparatus for controlling the variables in dynamic processes and the like which embodies a constant speed, reference signal means against which is compared a signal obtained from the actual performance of the process, together with means to utilize any differences between the signals so produced substantially to eliminate the variable which occurs during operation of the process. Apparatuswise, one constant speed rotary member and one variable speed process driven member are so mounted as to be axially relatively movable, and this movement is utilized to bring the process back to the desired performance rate.

---

This invention relates to a process and apparatus for maintaining substantially constant flow of fluids, particularly where the fluids are being delivered from a source thereof under varying pressure or into a receptacle or container which is subject to varying back pressure on the incoming fluid, or either or both.

In various installations in the art of fluid flow it is oftentimes highly desirable accurately to control the flow of fluids from one part of an apparatus to another to the end that there shall be delivered to a given portion of the apparatus a precise quantity of fluid in unit time. Obtaining constant volumetric flow into many types of apparatus is a difficult problem. This is particularly true where the receptacle receiving the fluid is subject to back pressure, or other impediments to the maintenance of constant flow and constant withdrawal therefrom such, for instance, as variations in temperature, densities, and pressure on top of the fluid in the receiving vessel. In like manner the same difficulty arises where the source of fluid also is under varying pressure.

More particularly, in carbonating water such as is used for making carbonated beverages, it is highly desirable that the volume of water flowing in unit time into the carbonator, where it is mixed with the carbonic gas, be constant. In practice it is customary to pass the water into a carbonator which also is cooled or chilled, whereby the water absorbs the correct proportion of gas. In such apparatus the carbonic gas is maintained as a gaseous head in the top of the vessel and the incoming water to be carbonated flows over baffles and cascades downwardly into the bottom of the vessel where the finely carbonated, cooled water is removed. In practice, due to changes in carbonic gas pressure, temperatures, rate of withdrawal from the carbonator and other factors, there is a variable back pressure in the carbonator which opposes the entry of the uncarbonated water thereinto. Since the source of water delivered to the carbonator usually is the city water line, the pressure also varies. In the past these variables have resulted in unequal carbonization, from time to time, during the operation with resultant decrease in the quality of the final beverages compounded from such carbonated water.

In view of hte foregoing, an object of my invention is to provide a process and apparatus by means of which, in simple manner, and with a high degree of accuracy, fluids such as liquids may be passed from a source of supply into a receiving vessel, in which vessel there may exist varying degrees of back pressure upon the influx of such fluids, in such manner that there is a substantially constant volumetric flow of fluid maintained at all times into such vessel.

More particularly, an object of my invention is to provide a process of the character designated in which the substantially constant volumetric flow into a vessel is maintained by continuously measuring the actual volumetric rate of flow into the vessel, and utilizing such measurement to compensate for variations either in the pressure of the source of supply or the back pressure from the vessel to which the fluid is being delivered, whereby a substantially constant rate of delivery is maintained.

Another object of my invention is to provide apparatus of the character designated in which the conduit conveying the fluid to the variable pressure vessel is provided with a rotating output fluid meter, whereby the volume of flow passing into the vessel such as a carbonator cooler is accurately reflected by the number of revolutions in unit time made by such meter, in combination with means to utilize the rate of rotation of such meter to maintain constant the volume of fluid being delivered into the receiving vessel.

More particularly, an object of my invention is to provide a system of the character designated in which the fluid to be supplied in constant volume to the vessel is supplied under pressure and under control of a fluid pressure operated valve, which valve is spring biased toward open position and movable toward closed position by a source of fluid under pressure, such as air, in combination with means in response to the rotation of the aforementioned fluid meter to bleed off air from the control for said pressure operated valve whereby the operation of said valve in its closing motions are directly related to and controlled by the volume of fluid flowing through said rotational output fluid meter, thereby maintaining constant flow of fluid into the receiving vessel.

Briefly, my invention in its constructional aspect comprises a pump which delivers fluid from, say, a reservoir or tank into a carbonator cooler. The pump delivers the fluid to a conduit which is under control a valve, which valve may be spring biased toward open position and may be of the diaphragm type pneumatically controlled for movement toward closed position. From the valve just mentioned, the fluid passes to the inlet side of a fluid meter and from the discharge side it passes directly into the carbonator cooler. The fluid meter, through a pinion, drives an idler gear. Associated with the idler gear through a threaded connection or a cam, preferably the former, is a second gear which is driven at constant speed by means of a constant speed motor. The last mentioned gear is associated with a bleed valve for the fluid impressed upon the pneumatic control circuit for the valve in the main line between the source of supply and the carbonator cooler. It will be understood that a substantially constant pressure is maintained in the pneumatic control lines for the control valve. Therefore, with the system in operation and with the constant speed motor driving the second gear, so long as the fluid motor rotates at the same rate as the reference, constant speed gear, then constant flow of fluid is maintained into the carbonator cooler. If for any reason, such as a change in temperature of the carbonator, a variation of pressure either in the source of supply or in the carbonator itself, the fluid meter should slow down, this disturbs the relative constant rate of rotation between the first and second gears, whereupon the second gear driven by the constant speed motor operates faster, physically separating it through the threaded member or the cam, as the case may be, from the first gear. This phsyical separation of the two gears causes the opening of the bleed valve, this having the effect of permitting the spring further slightly to open the main control valve, immediately correcting the decrease in volumetric flow into the carbonator cooler, bringing it back to the set rate. By simple speed control means on the constant speed motor, constant rates of delivery into the carbonator cooler may be selected and maintained by the means described. It will be apparent that any variation either in the pressure of the pump supplying the system, or back pressure in the carbonator cooler, or any other cause resisting the maintenance of a constant delivery into the carbonator cooler causes the system immediately to sense the same, initiating immediately and almost instantaneously a correction by opening the bleed valve, permitting the main valve to open slightly, thereby making the desired correction. Should the flow increase for any reason the opposite actions take place.

Apparatus suitable for carrying out my improved process and which also illustrates the constructional features of my invention is shown in the accompanying drawings forming a part of this application in which:

FIG. 1 is a somewhat diagrammatic, side elevational view showing the principal portions of my improved apparatus;

FIG. 2 is a vertical, enlarged sectional view of the bleed valve;

FIG. 3 is a detail, enlarged sectional view taken generally along line III—III of FIG. 1; and FIG. 4 is an exploded view showing a typical one of the pinions driven by the fluid meter or the constant speed control and illustrating the slip drive therefor associated between such pinions and their respective shafts.

Referring now to the drawings for a better understanding of my invention I show in FIG. 1 in diagrammatic manner a source of supply for fluid indicated by the tank 10. The fluid from the source 10 is to be delivered at a constant volumetric flow into a receiving vessel indicated diagrammatically at 11 as being a carbonator cooler. The fluid, such as water, may be supplied to the reservoir 10 through a conduit 12 from a source of supply, such as a city water main or from water conditioning equipment. Carbonic gas may be supplied to the carbonator cooler through a line 13 and through a pressure regulating valve 14. As will be understood, the carbonator cooler has a number of vertical baffles 16 therein, the fluid being delivered by a sprayhead 17, into the cooler as shown. The baffles 16 are hollow and refrigerant is circulated through them. The carbonated fluid may be withdrawn for use through a conduit 18.

The water from the reservoir 10 may be delivered therefrom by a pump 19 into a line or conduit 21. The fluid passes from the discharge side of the pump through a diaphragm operated, pneumatically controlled valve indicated at 22. The valve is biased toward open position by a spring 23 and in a manner well understood for such devices may be closed by the diaphragm 24 when pressure applied thereto through the line 26 exceeds the force of the spring 23. Thus, the control air pressure for the valve 22 may be maintained by a pump 27 which supplies air under pressure through a pressure regulating valve 28 to a line 29. In line 29 is a needle valve 31 and from the needle valve air under constant pressure is delivered into the line 26.

At 32 I illustrate a form of bleed valve which may comprise a body portion 33 in which there is a movable conical valve element 34. The movable element 34 of valve 32 is biased towards closed position by means of a spring 36. Thus, air under pressure from the line 26, which line may be provided with a manual shut-off valve 37, enters chamber 38 of the valve 32 and thence is bled to the atmosphere when the valve is open as will be later described. Therefore, opening of valve 32 permits spring 23 to open the main control valve 22, or at least, permits it to move the valve 22 more toward open position when air is bled from line 26.

Located on the discharge side of the main valve 22, in the line 21, is a rotational output fluid meter 39 having an output shaft 41. As is known for such devices, the shaft 41 of the meter 39 rotates precisely in accordance with the amount of fluid passing through the meter and is an accurate, dependable indication of the volume of flow through the line in which it is installed.

The top of shaft 41 may be provided with a plurality of serrations indicated at 42 in FIG. 3. A pinion 43 has a hub portion 46 provided with complementarily shaped serrations 47. Thus, the pinion 43 simply fits on top of the shaft 41 and its driving engagement with the shaft 41 is through the serrations 42–47, providing a simple, efficient slip clutch arrangement for a purpose later to be described.

Mounted for rotation on a suitable upstanding bearing 48 is an idler gear 49 in mesh with the pinion 43. The hub 51 of gear 49 is tapped and threaded as illustrated to receive the threaded end of a rod or shaft 52. The shaft 52 carries a gear 53, and this gear in turn is in mesh with a pinion 54 supported on a shaft 56 in identical fashion as illustrated in connection with the shaft 41 and pinion 43. The shaft 56 is the output shaft from a constant speed, electrically driven gear motor illustrated diagrammatically at 57. The gear motor may have the usual manually operable speed selector knob 58 by means of which the speed at which the shaft 57 turns may be predetermined and set.

It will be noted that the plunger of valve 32 is disposed directly above the upper end of shaft 52 which carries the gear 53 and is in contact therewith. When, due to the threaded connection of shaft 52 with the threaded hub 51 of gear 49, gear 53 rises vertically relative to gear 49, the shaft 52 engages the plunger 34 of valve 32 and opens the valve.

From the foregoing the method of carrying out my improved process, the method of constructing and using my improved apparatus and the advantages thereof may now be more readily explained and understood. Let it be assumed that it is desired to deliver into the carbonator cooler water at the rate of 10 gallons per minute. The system is started by setting the pump 19 in operation, by starting the air compressor 27, opening valve 37 in line 26 and starting the constant speed control device 57. So long as water flows through the rotational output fluid meter at the rate of precisely 10 gallons per minute, which speed has been previously determined by precise selected rotational speed of the gear 53, then the gears 49 and 53 rotate at precisely the same rate. Under these conditions there is some air being bled from the line 26 because the shaft 52 is set just to contact and slightly lift the movable part 34 from its seat. Let it be assumed that for reasons of back pressure in the vessel 11 or otherwise, the flow tends to decrease. This is immediately reflected by a decrease in rotation of shaft 41 of the rotational output fluid meter. Since gear 53 is being driven at a precisely constant rate, slowing down of gear 49 causes relative rotation between the threaded shaft 52 and the threaded hub 51, whereby the gear 53 moves upwardly, its shaft 52 further opening the movable portion 34 of valve 32, thus reducing the control air pressure in the line 26. This immediately permits the spring 23 further to open the main control valve 22, immediately thereby bringing the gear 49 back up to its predetermined speed. As soon as the speed of gear 49 again reaches the speed of gear 53, (and at first it will slightly exceed this speed) gear 53, due to the threaded connection of its shaft 52, reassumes its original position, thus accurately maintaining substantially constant flow into the carbonator cooler. It will be noted that regardless of whether the variation in pressure is at the pump 19, through the lines, or back pressure in the vessel 11, or otherwise my improved process and apparatus accurately compensates for such variations, immediately, thereby to maintain at all times a predetermined constant flow of fluid into the vessel 11.

In the event the system becomes so out of balance as to cause the gear 53 to rise upwardly to the extreme upper operating position of the movable element 34, valve 32, the clutch connections 42–47 between the pinions 43 and 54 with their respective shafts 41 and 56 permits slipping between these drives, eliminating the danger of damage to the parts.

In view of the foregoing, it will be apparent that I have devised an improved process and apparatus for maintaining constant flow of fluids such as liquids into a vessel on which there may be some back pressure, or from the supply source of which there may be some varying pressure, from time to time. In the practical application of my invention to the soft drink industry, it is always desirable to maintain a constant, regulated flow of water to be carbonated through a crabonator cooler, for various reasons. Among these may be mentioned the savings in carbonic gas and the maintenance of precise degrees of carbonation of the water. It will be apparent that any variation in pressure of the head of carbonic gas within the vessel 11 will affect the rate of flow into that vessel, as will change in the temperature of the water or even ambient the temperature of the room in which the apparatus is located.

My invention has proven to be extremely practical and satisfactory and with it I have effected substantial savings in materials, and a greatly improved quality in beverages bottled with water carbonated by my improved apparatus and process.

While I have particularly described my invention in association with a carbonator cooler, it will be obvious that it is entirely suitable for use in various situations where the problems mentioned herein are encountered.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. Mechanism for controlling variables in dynamic processes and the like,
   (a) a first rotary member,
   (b) means to rotate said first rotary member at a substantially constant speed which is representative of a non-varying rate of performance of the process,
   (c) a second rotary member axially aligned with said first rotary member,
   (d) means to rotate said second member at speeds accurately reflecting the existence of a variable rate of performance in said process,
   (e) means mounting said rotary members for axial movement relative to each other, whereby upon occurrence of a variable rate of performance in said process said members move axially relative to each other, and
   (f) mechanism effective upon relative axial movement of said rotary members to initiate a corrective action upon the rate of performance of said process, thereby to eliminate said variable therein whereby the rate of performance is maintained substantially constant as determined by the substantially constant speed of said first rotary member.

2. In apparatus for delivering a substantially constant volumetric flow of fluid from a source of supply to a receiver,
   (a) volume flow indicating means ahead of the receiver embodying a first gear member which rotates at a speed proportional to the volume being delivered to the receiver,
   (b) a second gear member driven at a substantially constant speed representative of the desired rate of volumetric flow into the receiver,
   (c) means operatively associating said gear members for rotation about axially aligned axes and effective substantially instantaneously upon deviations from the desired rate of flow as indicated by a change in speed of the first gear to cause said gears to move apart axially,
   (d) a motorized valve controlling the flow from the source of supply to said receiver, and
   (e) means operatively associating said motor for said valve with said gears, whereby said valve opens and closes in accordance with the relative axial relationship of said gears.

References Cited

UNITED STATES PATENTS

| | | | |
|---|---|---|---|
| 2,263,055 | 11/1941 | Smith | 137—1 |
| 3,089,030 | 5/1963 | Scherbatskoy | 137—2 X |
| 2,602,656 | 7/1952 | Clark | 137—30 |
| 2,948,295 | 8/1960 | Smith Jr. II | 137—487.5 |
| 3,174,504 | 3/1965 | Rosenbrock et al. | 137—487.5 XR |
| 3,272,217 | 9/1966 | Young | 137—487.5 XR |

FOREIGN PATENTS 701,764  12/1953  Great Britain.

M. CARY NELSON, *Primary Examiner.*

ROBERT J. MILLER, *Assistant Examiner.*